Aug. 11, 1970    C. E. DADY    3,523,868
APPARATUS AND METHOD FOR MONITORING FISSION PRODUCTS
Filed Jan. 26, 1968    3 Sheets-Sheet 1
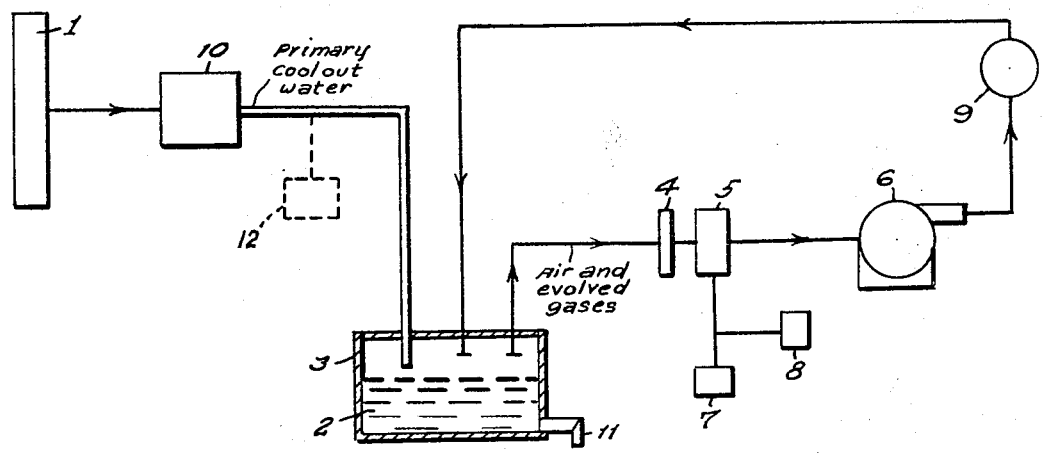
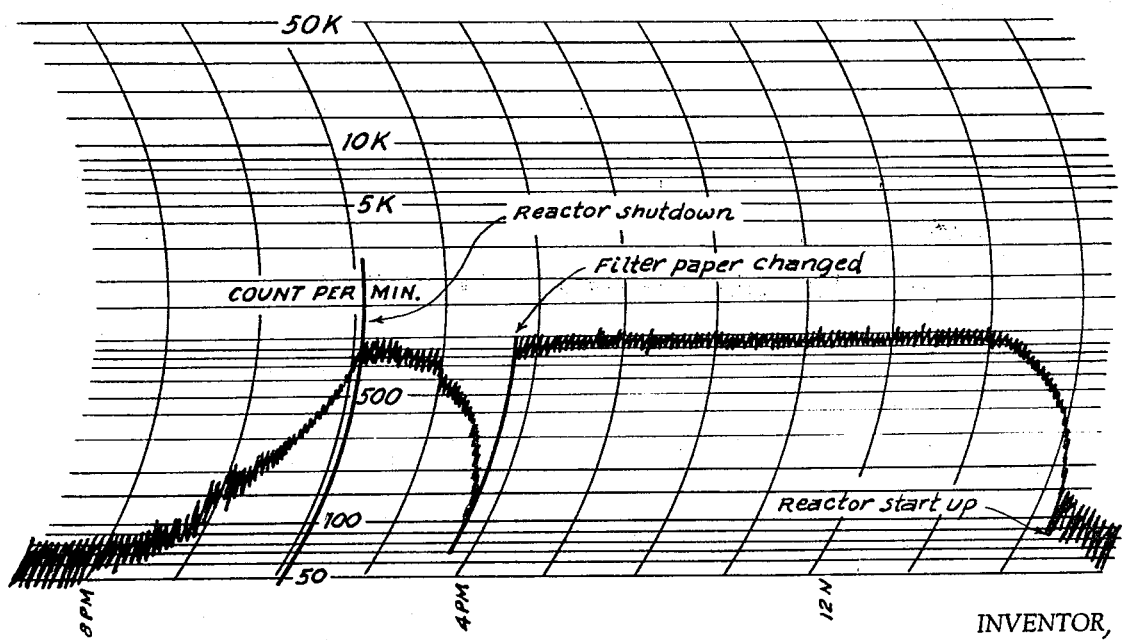
INVENTOR,
Charles E. Dady
BY: Harry M. Saragovitz,
Edward J. Kelly +
R. P. Gibson    ATTORNEYS.

INVENTOR,
Charles E. Dady

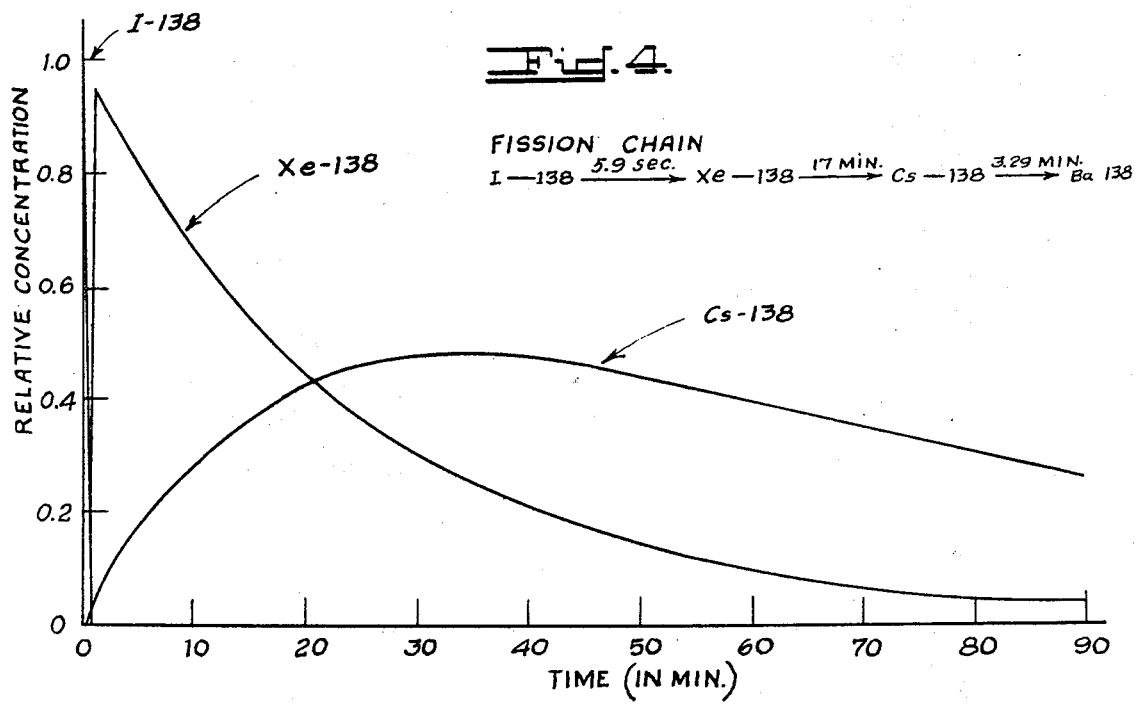
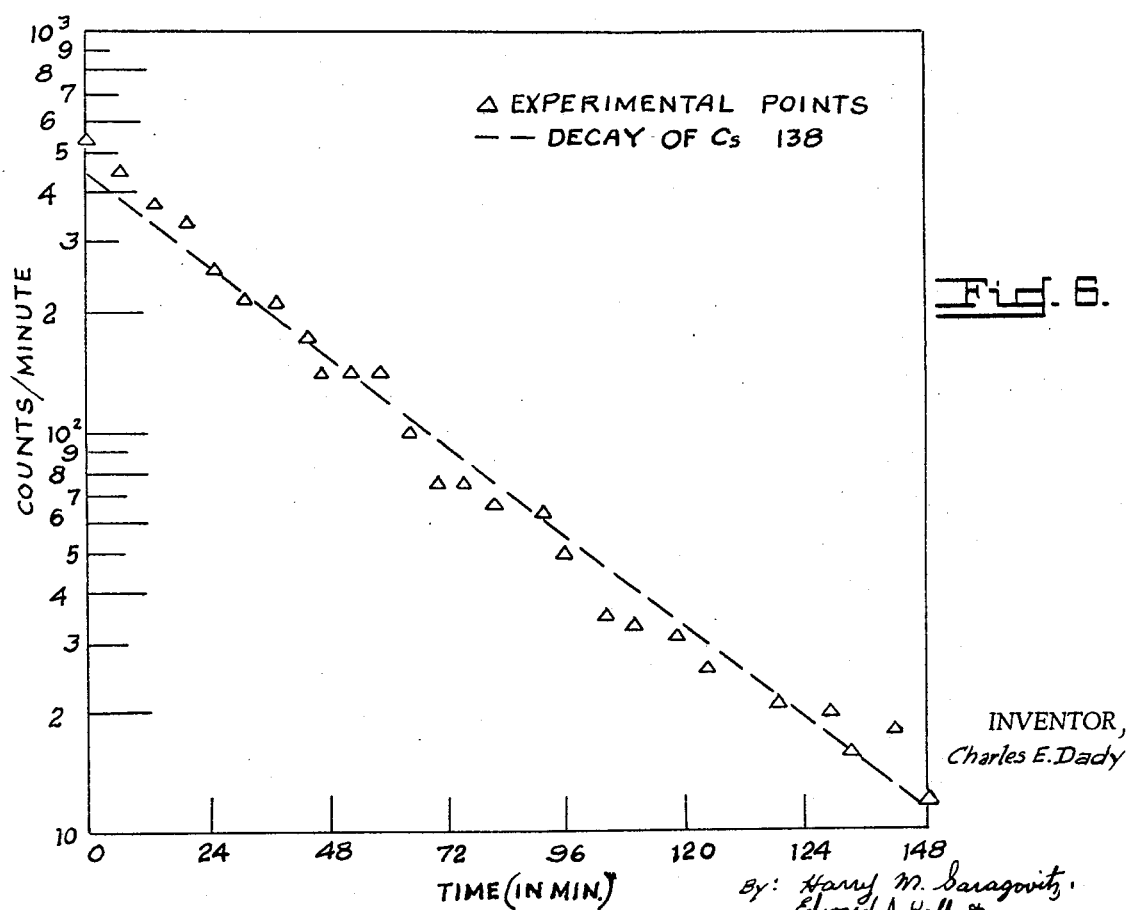

United States Patent Office 3,523,868
Patented Aug. 11, 1970

3,523,868
APPARATUS AND METHOD FOR MONITORING FISSION PRODUCTS
Charles E. Dady, 100 Border Road, Reading, Mass. 01867
Filed Jan. 26, 1968, Ser. No. 700,837
Int. Cl. G21c 17/02
U.S. Cl. 176—19      7 Claims

ABSTRACT OF THE DISCLOSURE

A nuclear reactor fission-product monitor having a coolant water reservoir and recirculation system for gases evolved from the water. The evolved gases radioactively decay to products which are removed and analyzed.

---

The invention described herein may be manufactured, used, and licensed by or for the Government for governmental purposes without payment to me of any royalty thereon.

The subject invention relates to an apparatus for continuously monitoring the fission products of a nuclear reactor and to the system of operation pertaining thereto.

Actual experience with the detection of fuel element leaks in a number of nuclear reactors has pointed up the inadequacy of presently available fission-product monitors. Resin-type fission-product monitors in use with pool-type reactors often fail to effectively eliminate Ar-41 and corrosion products. The sensitivity of these monitors, particularly right after start-up when the signal-to-noise ratio is small, is such that they fail to serve one of their major objectives—to act as an early warning device for fuel element leaks. It is known that at a number of reactor installations where fuel element leaks have occurred, the air particulate monitors, rather than the fission-product monitors, have given the first indication of fuel element failure. Because of this, many reactor personnel rely on air particulate monitoring for notification of fuel failure, thereby losing the early warning possible with the use of a truly effective fission-product monitor.

There are some who believe that early warning is unnecessary so long as detection is made before a serious condition develops. While this philosophy may be tenable in power or heavy water reactor cases where air-borne activity is contained and does not endanger personnel or property, it is indefensible where, as with open-pool type reactors, an environment may be contaminated before detection of fuel failure by air monitors. Inasmuch as the response of most air monitoring systems is slow, and the data generated difficult of interpretation, high activity is often manifested before the failure is suspected.

It is the primary object of the present invention to provide an apparatus and system capable of detecting a fuel element leak long before the air activity in or around a nuclear reactor reaches a level sufficient to activate an air particulate monitor.

It is another object to provide a device capable of monitoring fission products resulting from as few as ten micrograms of U-235.

It is another object to provide a fission-product monitor which effectively eliminates Ar-41, gamma background from any Ar-41 which might be present in the system, corrosion product interference, and background activity from isotopes such as Na-24.

It is another object to provide a monitoring system which will reach 90% of equilibrium in an hour and a half.

It is another object to provide a monitoring system free of long-lived background build-up.

It is another object to provide a monitoring system for use with a simple Geiger-Muller (GM) detecting system, rather than a more expensive NaI detecting system with its linear amplifiers and discriminators. Further, the utilization of a low gamma-sensitive GM detector avoids the need of extensive shielding, often necessary with NaI detectors.

It is a final object to provide a monitoring system immune to geometry changes by insuring a fixed source-to-detector geometry during the entire monitoring period.

These and other objects and advantages of the present invention will be fully apparent from the following description taken in connection with the annexed drawings, in which:

FIG. 1 is a block diagram depicting the present invention and its flow of water and gases;

FIG. 2 is a strip chart depicting the output of the present invention during two-megawatt operation of an open-pool type reactor;

FIG. 4 is a chart depicting the decay of I-138;

FIG. 6 is a chart depicting the decay of activity on filter paper utilized in the present invention.

Figure 3:
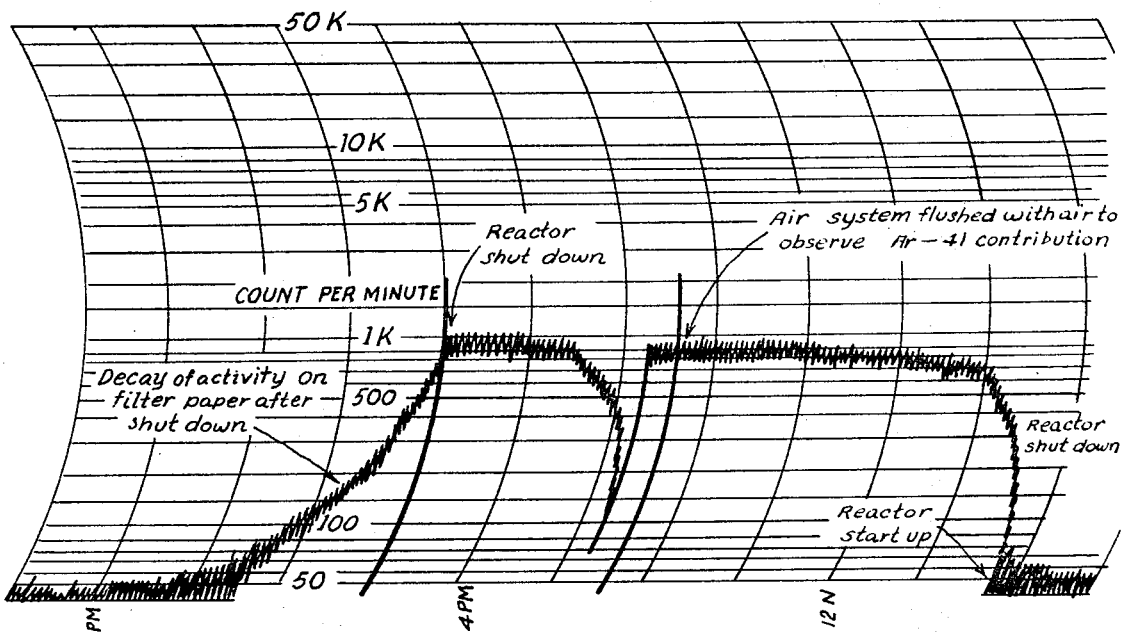
FIG. 3 is a strip chart depicting the output of the present invention during two-megawatt operation of an open-pool type reactor during which the air circulation system was flushed to observe Ar-41 contribution.

Briefly, the operation of the instant invention is as follows. A sample of primary water from the reactor coolant system is removed after it has passed through the reactor core 1. The sampled water 2 is held in a reservoir 3 while evolved gases from the water are recirculated in the air-monitoring section of the system. Fission-product gases which radioactively decay to daughters particulate in nature, are passed through a filter 4 and continuously monitored by means of a detector 5. The air and gases are returned to the reservoir by recirculating means such as a blower 6 and a rotometer 9. In this manner the air and gases are continuously circulated through the air-monitoring section of the system.

The major activity on the filter is Cs-138. This cesium isotope results from the decay of gaseous xenon in the following manner:

$$\text{I-138} \xrightarrow{5.9 \text{ sec.}} \text{Xe-138} \xrightarrow{17 \text{ min.}} \text{Cs-138} \xrightarrow{32.9 \text{ min.}} \text{Ba-138}$$

Recirculation of the air, and the maintenance of a reservoir results in a build-up of Cs-138 on the filter 4 which is sufficient to permit continuous monitoring using a coplanar GM detector as depicted in FIGS. 2 and 3.

At a power level of 2 mw., Cs-138 can be detected by standard air monitoring systems used to monitor particulate activity in the containment shell. However, the Cs-138 is present in a very low concentration and the radon and thoron daughter products from natural background makes the qualitative determination of Cs-138 difficult and a quantitative determination all but impossible. The gravamen of the subject invention is the recirculation of the air over the coolant water in a closed system. In that manner, the particulate daughters of radon and thoron can be virtually eliminated and the Cs-138 more readily detected. As the source of Cs-138 in the air is gaseous Xe-138 which reaches maximum concentration in coolant water 1.2 minutes after leaving a reactor core (FIG. 4), the water should be sampled after this period.

In the system as tested, the sampled water flow rate was controlled at 200 ml./min. and the reservoir maintained at approximately four liters. Sampled water reached the reservoir from the hold-up tank 10 two minutes after it passed through the core. To maintain constant volume, water was continuously drawn off from the reservoir. The water entered the reservoir at 114° C.; by drawing off cooler water from the bottom of reservoir 3 by means of drain 11, funneling of the water was prevented. The air and gases above the reservoir were continuously recirculated through the air section of the system at the rate of 10 c.f.m. The particulate activity resulting from the decay of their gaseous precursors was continuously removed by filter paper and monitored by a thin-window GM tube. The GM tube window was coplanar with the filter paper and arranged a distance of 1 cm. from the paper. Output from the detector was fed to a ratemeter 7 and a recorder 8. A typical run of this embodiment as recorded by the strip chart recorder is depicted in FIGS. 2 and 3.

Figure 5:
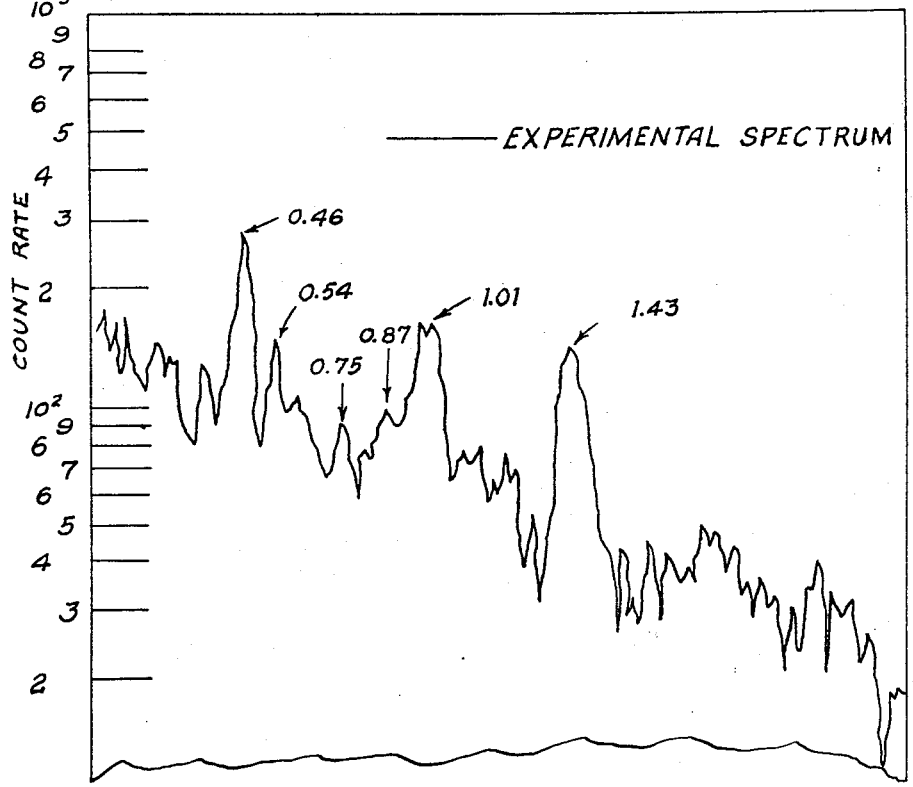
FIG. 5 is a chart depicting the gamma spectrum of filter paper utilized in the present invention.

A gamma spectrum of the filter paper (FIG. 5) showed only the Cs-138 peaks to be readily detectable. The half-life of the activity, which was determined with the GM detector and scaler, is depicted graphically in FIG. 6. The half-life—slightly shorter than 32.9 minutes—is probably due to a small amount of the shorter half-lived Rb-88 and/or Rb-89:

$$\text{Br-88} \xrightarrow{15.55 \text{ sec.}} \text{Kr-88} \xrightarrow{2.77 \text{ hr.}} \text{Rb-88} \xrightarrow{17.8 \text{ min.}} \text{Sr-88}$$
$$\text{Br-89} \xrightarrow{4.55 \text{ sec.}} \text{Kr-89} \xrightarrow{3.8 \text{ min.}} \text{Rb-89} \xrightarrow{15.4 \text{ min.}} \text{Sr-89}$$

Rb-89 contributed a minimal amount of activity to the filter paper because inert gas was not used to strip gases from the water. Therefore, dissolved gases are evolved more slowly, allowing most of the 3.8 min. Kr-89 to decay to Rb-89 while it is still in the water. Although the Rb-88 contribution was probably greater than that of Rb-89 because of the 2.77 hr. half-life of its gaseous precursor, it was not readily detectable in a gamma spectrum of the filter paper. Moreover, the strip chart equilibrium values did not have a large slope as would be expected if Rb-88 made a large contribution to the collected activity.

The effect of placing a cation and anion resin 12 upstream of the reservoir was investigated. The monitoring system gave the same response with and without the resins. It is submitted that this demonstrated the absence of interference from any fission products which are removable in resin columns. It should be noted, however, that background activity due to isotopes such as Na-24 in the reservoir is reduced by the use of resins. Further, the use of resins reduces the liquid waste problem created by the siphoned water.

There is no long-lived background build-up with the present invention as in the case of resin-type detectors. FIGS. 2 and 3 illustrate that all activity on the filter paper decayed rapidly when the reactor was shut down. Moreover, the system was operated several times with the reactor coolant water shut off. During these periods, the background remained at zero, indicating that radon and thoron daughter products did not contribute significantly to the detected activity.

While only preferred forms of the invention are shown and described, other forms of the invention are contemplated and numerous changes and modifications may be made therein without departing from the spirit of the invention as set forth in the appended claims.

What is claimed is:
1. In combination with a nuclear reactor including a core of fissile nuclear material and a liquid coolant circulating through said core, an apparatus for monitoring fission products comprising a tank arranged to receive continuously a portion of said coolant, said coolant evolving gases carrying radioactive particulate, run-off means mounted below the level of said coolant in said tank to keep said coolant level constant, gas collecting means mounted on said tank at a point above said portion of coolant, filter means arranged within said collecting means, and radiation detecting means arranged adjacent to said filter means, whereby the particulate is filtered out of the gas and its activity detected.

2. The apparatus set forth in claim 1, wherein said gas collecting means consists of conduit means leading from said tank, pump means mounted at the end of said conduit opposite said tank, and second conduit means carried by said pump means and returning to said tank, whereby said gas is recirculated through said tank.

3. The apparatus set forth in claim 2, wherein said filter means consists of filter paper.

4. The apparatus set forth in claim 3, wherein said radiation detecting means consists of a thin-window tube arranged coplanar with and 1 cm. from said filter paper.

5. A method of monitoring fission products, comprising the steps of selecting a portion of primary liquid coolant from a nuclear reactor core, trapping said coolant in a receptacle, accumulating a predetermined amount of said coolant in said receptacle, withdrawing coolant from said receptacle at a rate equivalent to the trapping rate, removing from said receptacle the gases evolved from said coolant recirculating, and passing said gases through a filter, and exposing the particulate filtered out of said gases to a radiation detector.

6. A method as set forth in claim 5, including the intermediate steps of detaining said selected coolant for approximately two minutes, and a final step of returning said gases to said receptacle.

7. A method as set forth in claim 6, wherein said gases are removed and returned at 10 cubic feet per minute.

References Cited

UNITED STATES PATENTS

| | | | |
|---|---|---|---|
| 3,070,532 | 12/1962 | Zebroski | 176—19 |
| 3,073,767 | 1/1963 | Whitham et al. | 176—19 |
| 3,178,355 | 4/1965 | Jacobs | 176—19 |
| 3,419,467 | 12/1968 | Holzer et al. | 176—19 |

FOREIGN PATENTS

| | | |
|---|---|---|
| 819,366 | 9/1959 | Great Britain. |
| 900,247 | 7/1962 | Great Britain. |

REUBEN EPSTEIN, Primary Examiner

U.S. Cl. X.R.

176—37